Patented Jan. 1, 1929.

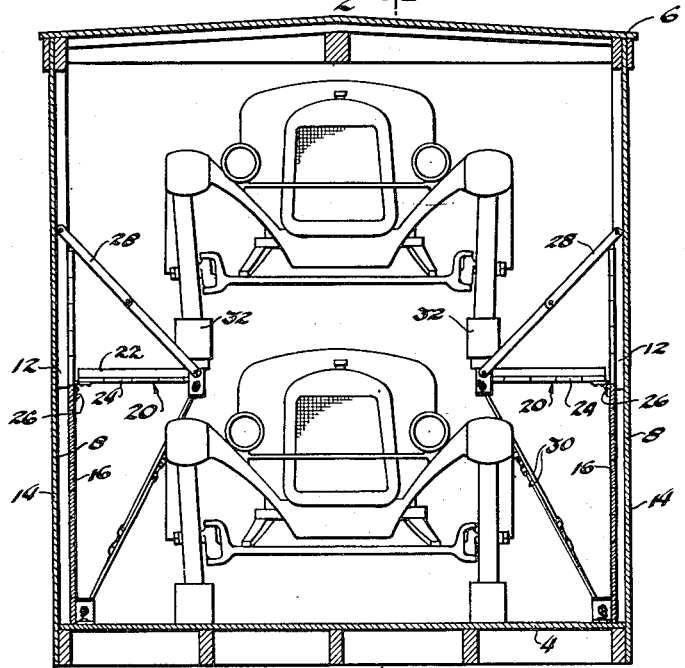
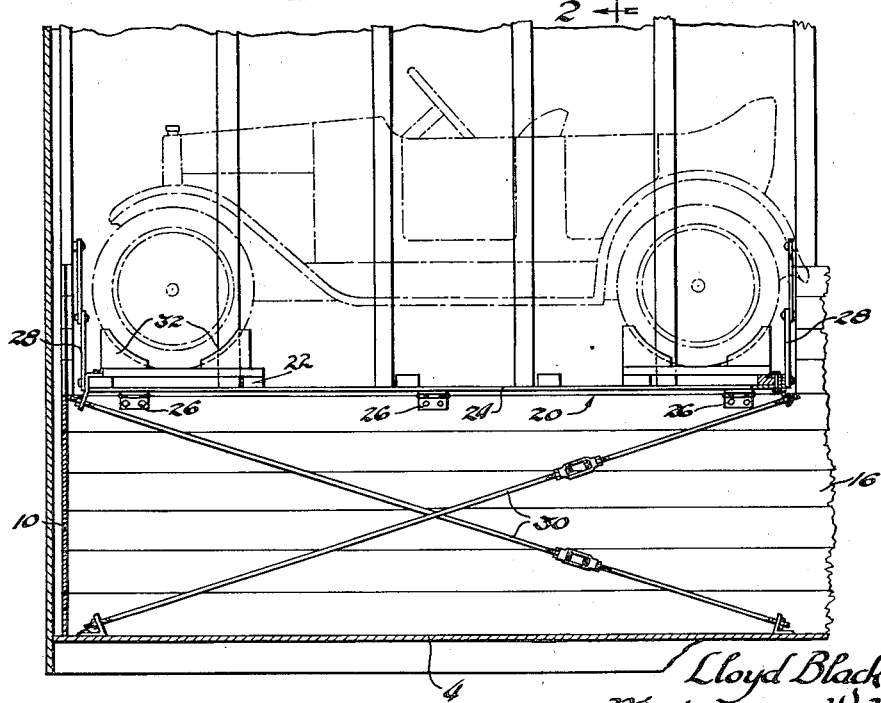

1,697,807

UNITED STATES PATENT OFFICE.

LLOYD BLACKMORE, OF HIGHLAND PARK, MICHIGAN, AND MONTGOMERY W. McCONKEY, OF SOUTH BEND, INDIANA, ASSIGNORS TO GENERAL MOTORS CORPORATION, OF DETROIT, MICHIGAN, A CORPORATION OF DELAWARE.

AUTOMOBILE SHIPPING DEVICE.

Original application filed June 13, 1924, Serial No. 719,759, now Patent No. 1,655,129, dated January 3, 1928. Divided and this application filed October 13, 1927. Serial No. 225,922.

This application is a division of our prior application, Serial No. 719,759, filed June 13, 1924, Patent No. 1,655,129, Jan. 3, 1928.

The invention relates to the shipment of automobiles in freight cars and has to do particularly with means for supporting one automobile above the other in a box car of standard construction. As in the elected form in our prior application, we prefer to make the supporting means foldable so that when the car is empty, the supporting members may be moved out of the way and the car may be used for other purposes. We have particularly designed the car so that when the supports are folded away, it presents a clean, unobstructed interior making it suitable for use in the shipment of grain and similar commodities.

Supporting devices made according to our invention consist of sections pivoted to the walls of the car and adapted to receive and support the automobile. Four of these sections are preferably provided, one for each of the wheels of the vehicle. Each section is supported by suitable braces and struts which may also be foldable if desired. The sections are preferably so designed that when folded out of the way, they assume a position flush with the interior wall of the car forming a tight joint therewith.

In the drawing, Figure 1 is a vertical section through a box car provided with our improved supporting means.

Figure 2 is a view taken on line 2—2 of Figure 1.

4 indicates the bottom, 6 the top, 8 the side walls and 10 an end wall of a box car of conventional construction. The side walls comprise studs 12 to which are secured the outer sheathing 14 and the inner lining 16. The lining extends as usual to a point about midway of the height of the car. At each side of each end of the car, a section of the liner indicated at 20 is so arranged as to serve as a support for the front and rear wheels of an automobile. Each of the sections 20 consists of strips 22, preferably in the form of two-by-fours, secured together by sheathing 24. The sections 20 are pivoted to the adjacent portions of the liner by means of hinges 26. Suitable means is provided for supporting the section 20 in horizontal position. I have illustrated folding braces 28 and cross struts 30, the latter acting as thrust members to transmit a portion of the weight of the car to the car floor.

The sections 20 may be provided with any suitable means for receiving and supporting an automobile. I have illustrated shoes 32 arranged in pairs at the opposite ends of the section and shaped to receive the wheels of the automobile.

It is obvious that when the car has been unloaded, it may be converted into a box car of conventional interior by simply removing the struts 30 and swinging the sections 20 into position flush with the adjacent portions of the liner. The braces 28 obviously assume a folded position between the section and the outer wall of the car. With the parts in this position, it is obvious that it may be used for the shipment of various commodities such as grain, which require a tight car.

We claim:

1. A freight car comprising, in combination, side walls having inner linings, means carrying the upper section of the lining of each wall and which is arranged to permit said section to be swung out to form a shelf, and means to secure an automobile on the shelves formed by opposite swinging sections of the linings.

2. A box car comprising, in combination, opposite walls, wall sections pivoted to said walls and adapted to be swung to horizontal positions, means for bracing the wall sections in said last-named position, and means on said sections for supporting an automobile.

3. In the combination as defined in claim 2, said car being provided with an interior liner and said wall sections, when swung to non-supporting position, being adapted to lie flush with the inner surface of said liner.

In testimony whereof I affix my signature.
LLOYD BLACKMORE.
In testimony whereof I affix my signature.
MONTGOMERY W. McCONKEY.